E. J. BRISBEN.
EMERY WHEEL DRESSER.
APPLICATION FILED APR. 11, 1910.
990,193.
Patented Apr. 18, 1911.
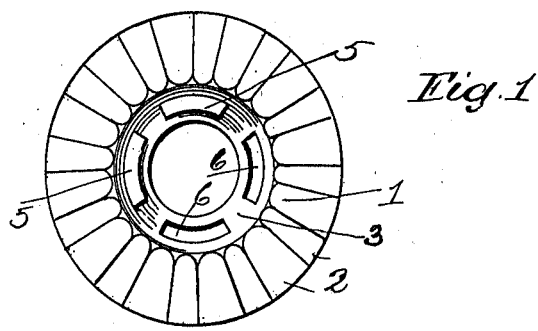
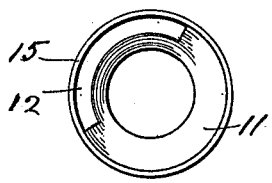
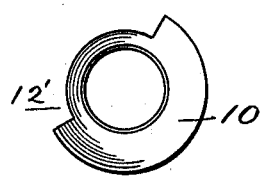
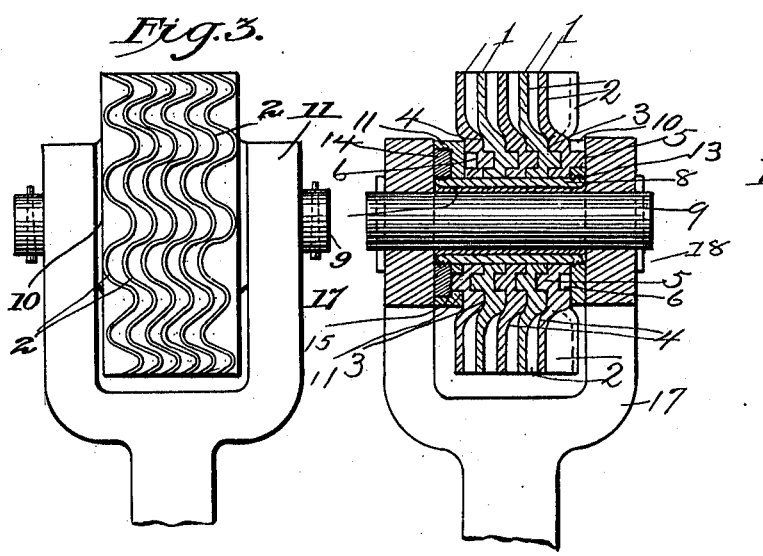

UNITED STATES PATENT OFFICE.

ERNEST J. BRISBEN, OF CLEVELAND, OHIO.

EMERY-WHEEL DRESSER.

990,193.  Specification of Letters Patent. Patented Apr. 18, 1911.

Application filed April 11, 1910. Serial No. 554,722.

*To all whom it may concern:*

Be it known that I, ERNEST J. BRISBEN, a citizen of the United States, and resident of Cleveland, in the county of Cuyahoga and State of Ohio, have invented certain new and useful Improvements in Emery-Wheel Dressers, of which I hereby declare the following to be a full, clear, and exact description, such as will enable others skilled in the art to which it appertains to make and use the same.

The objects of the invention are to provide an emery wheel dresser composed of a series of disks closely approximate together and having their edges fluted or corrugated and with the projecting edges of the flutes on one disk of the dresser adapted to enter the reentrant recesses in an adjacent disk and the flutes on one disk slightly spaced apart from the flutes on an adjacent disk out of active contact so as to give freedom of cutting action to the edges, and plenty of clearance for dust from the emery wheel, and no washers are inserted between the disks which move in unison.

The corrugations are preferably formed of metal of even thickness throughout, so that the wear from constant use will not destroy their efficiency, and the disks are distinctly interlocked with each other to prevent them from turning upon each other in such a manner as to lessen the spaces between the sides of the corrugations. They are also preferably interlocked with the clamping members or washers so as to rotate as a unit. They are then mounted upon a common pin or axle which is pivoted in a suitable handle.

The invention is hereinafter more fully described, illustrated in the accompanying drawings and specifically pointed out in the claims.

In the accompanying drawings Figure 1 is a face view of one of the disks; Fig. 2 is a longitudinal section of the dresser; Fig. 3 is a side elevation thereof; Fig. 4 is a face view of the outer clamping washer at one end of the bushing for the emery wheel; Fig. 5 is a face view of the inner washer at the same end; Fig. 6 is a face view of the clamping washer at the other end of the bushing.

In these views each disk 1 is shown provided with inwardly tapering corrugations 2 which extend inwardly toward a relatively flat central portion 3. The walls of these corrugations are formed of metal of even thickness throughout, and the central portion 3 may be formed of thicker metal if desired, and the corrugations may join the central portion by means of the curved terminal portions 4, 4. Each disk thus presents a fluted margin and the flutes or corrugations extending laterally beyond the central portion on each side thereof, so that the corrugations intermesh, but are spaced apart, and their cutting edges will always be preserved and also plenty of clearance will be obtained so that the dresser will not become clogged up with the dust of grinding. For this reason the side walls of the corrugations are preferably strictly parallel in section from their curved points of attachment to their margins.

The central portion of each disk is interlocked with the adjacent ones, preferably by means of pairs of lugs 5, 5, and pairs of recesses 6, 6, the lugs 5, 5, upon one disk adapted to enter the openings or recesses 6, 6, in the next disk. This form of construction makes the disk interchangeable. These openings or recesses are equally spaced so that the disks will always properly center with each other and make close joints to prevent the emery dust from getting between the central portions.

A central sleeve 8 and pin 9 preferably pass through the disks and the disks are secured together by means of washers 10 and 11, washer 11 provided with opening 12, and washer 10 with opening 12' in which the lugs 5, 5, on the disks can enter and so prevent the disks from revolving independently of the washers. The washer 10 is screwed upon the sleeve 8 at 13, and the washer 11 is sleeved over the sleeve 8 and a clamping disk or washer 14 is screwed upon the other end of the sleeve 8, and fits tightly within the annular marginal flange 15 upon the washer 11 thus securely fastening the parts together and preventing independent rotation of the disks. A central bronze or brass bushing 16 forms the bearing upon which the sleeve 8 is mounted, and the central pin 9 is secured in the arms of a forked handle 17 by means of a pin 18.

The disks may be made of cast chilled metal or of chilled sheet metal, and the corrugations may be curved or angular as desired. The preferable form being shown.

Preferably each disk is provided with two projections or lugs 5, 5, on each side alternating with two recesses 6, 6, on the same side, the recesses on one side being opposite the projections in the other side of the wall. The lugs 5, 5, are preferably adjacent to each other and the recesses also adjacent to each other. This permits of interchange in use and of turning the disks around. The disks can all be made in duplicate if desired.

Having described the invention what I claim as new and desire to secure by Letters Patent is:

1. In an emery wheel dresser, in combination, a series of cutting disks, each disk having a radially corrugated margin or annular zone and a relatively flat central portion and provided with a central opening, the said flat portions closely engaging with each other, the walls of said corrugations being parallel and of substantially even thickness throughout and the corrugations of each disk projecting beyond the flat central portion at their inner ends, and arranged to intermesh with the corrugations of adjacent disks, without touching each other.

2. In an emery wheel dresser, in combination, a series of cutting disks, having each a radially corrugated marginal portion, and a relatively flat central portion and provided with a central opening, the walls of said corrugations being of even thickness throughout, and the walls of the corrugations of each disk parallel to the walls of the corrugations of the other disks and the projecting corrugations of one disk arranged to enter the recessed corrugations of adjoining disks out of contact therewith, the said flat central portions of said disks closely engaging with each other and interlocking in both directions to preserve the corrugations in their relative positions to each other without touching in adjoining disks, and means for clamping the disks together.

3. In an emery wheel dresser, in combination a series of cutting disks having radially corrugated outer portions and relatively flat centers, said flat centers closely engaging with each other, and provided with central openings, the said corrugations of the several disks adapted to intermesh and not touch each other and parallel to each other, the walls of said corrugations being of even thickness throughout, means for interchangeably interlocking the central portions of the disks together in both directions, and a securing means for the disks.

4. In an emery wheel dresser, in combination, a series of disks having corrugated edges, and relatively flat central portions, said central portions closely engaging each other, the corrugations extending radially outward from said central portions, the said corrugations in the several disks being out of contact with each other, a screw threaded central support, means for preventing one disk from turning upon another on said support, and screw threaded washers clamping said disks securely together upon said central support.

5. In a disk for an emery wheel dresser adapted to form one of a series of similar cutting disks, a flat central portion and marginal corrugations adapted to extend radially therefrom, the walls of said corrugations being of an even thickness throughout, said disks provided with an engaging means comprising a projection and a recess on each side thereof, whereby it is prevented from rotating upon adjacent disks, and can be used interchangeably therewith.

6. In an emery wheel dresser, in combination, a series of cutting disks, having radially corrugated margins, and relatively flat centers said centers closely engaging each other, and provided with central openings, the walls of said corrugations being of even thickness throughout, and the projecting sides of the corrugations of one disk adapted to enter the reëntrant sides of the corrugations of the adjacent disk without contact therewith, a sleeve on which said disks are mounted, and clamping washers therefor and means for interlocking said disks and washers together.

7. In an emery wheel dresser, in combination, a series of cutting disks, having corrugated margins and relatively flat central portions said central portions engaging each other, a sleeve on which said disks are mounted, each disk provided with a lateral projection and with an oppositely placed transverse opening on each side, said projections and recesses alternately arranged, whereby said disks are locked together, in both directions, and a retaining washer upon each end of said sleeve, one of said washers provided with an opening in which the projection on one of the outer disks enters, said washers adjustably secured upon said sleeve.

8. In an emery wheel dresser, in combination a series of cutting disks, having corrugated margins, and relatively flat central portions, said central portions closely engaging each other, a sleeve on which said disks are mounted, each disk provided with a lateral projection on each side, and also with an opening on each side, the projection on one disk entering the opening in an adjacent disk, to permit said disks to be together in both directions, a sleeve on which said disks are mounted, a clamping washer on said sleeve at each end thereof, and on each side of said series of disks each washer provided with an opening adapted to receive the projection from the adjacent disk, said washers adjustably secured upon said sleeve.

In testimony whereof, I hereunto set my hand this 9th day of April 1910.

ERNEST J. BRISBEN.

In presence of—
 WM. M. MONROE,
 H. H. ANDERSON.

Copies of this patent may be obtained for five cents each, by addressing the "Commissioner of Patents, Washington, D. C."